United States Patent [19]

Karnofsky

[11] 4,144,229

[45] Mar. 13, 1979

[54] PROCESS FOR PREPARING A FLOUR AND THE PRODUCT OBTAINED THEREBY

[75] Inventor: George B. Karnofsky, Pittsburgh, Pa.

[73] Assignee: Dravo Corporation, Pittsburgh, Pa.

[21] Appl. No.: 745,469

[22] Filed: Nov. 26, 1976

Related U.S. Application Data

[63] Continuation-in-part of Ser. No. 611,066, Sep. 8, 1975.

[51] Int. Cl.² .............................................. A23J 1/14
[52] U.S. Cl. .................................. 260/123.5; 426/656
[58] Field of Search ...................................... 260/123.5

[56] References Cited

U.S. PATENT DOCUMENTS

| | | | |
|---|---|---|---|
| 2,635,094 | 4/1953 | Belter et al. | 260/123.5 |
| 3,734,901 | 5/1973 | Hayes et al. | 260/123.5 |
| 3,966,982 | 6/1976 | Becker et al. | 260/123.5 |

*Primary Examiner*—Walter C. Danison
*Attorney, Agent, or Firm*—Marn & Jangarathis

[57] ABSTRACT

There is disclosed a process for the extraction of oil from particulate oleaginous seed materials, such as soy beans, utilizing aqueous alcohols as the solvent to produce a novel flour, particularly a soy flour.

20 Claims, 2 Drawing Figures

PROCESS FOR PREPARING A FLOUR AND THE PRODUCT OBTAINED THEREBY

This application is a continuation-in-part of copending U.S. application Ser. No. 611,066 filed Sept. 8, 1975.

BACKGROUND OF THE INVENTION

This invention relates to the solvent extraction of oleaginous seed materials, and more particularly to a novel process for treating oleaginous seed materials utilizing aqueous alcohol to produce a protein-containing flour.

In such copending application U.S. Ser. No. 611,066 there is disclosed a process for preparing a product high in protein wherein particulate oleaginous seed material is sequentially extracted in three steps, comprising: contact with a relatively dilute aqueous alcohol to remove carbohydrates and non-oil lipids; contact with concentrated alcohol to remove the dilute alcohol; and contact with concentrated alcohol at or near the boiling point to remove oil, followed by desolventizing of the residual solids matter. In a particularly preferred embodiment of such invention, the oleaginous seed material is sequentially extracted in four steps, comprising: contact with a relatively dilute aqueous alcohol to remove carbohydrates and non-oil lipids; contact with concentrated alcohol to remove water; contact with undistilled, recycled concentrated alcohol at or near the boiling point to partially remove oil; and contact with distilled concentrated alcohol at or near the boiling point to complete oil removal. A novel high protein product is obtained by desolventizing the extracted residue.

In said copending application, the specification was addressed to the production, particularly for human consumption of soy protein concentrate, a product which, by commercial definition, contains at least 70% protein. It is now apparent that soy flour, a product of unspecified, but lower protein content, will be an important commercial product, provided that it has certain desired characteristics. These characteristics are: that the product be free of the non-oil lipids that give soybean products a beany flavor, that the product be free of those carbohydrates that cause flatulence, and that the product be as white as possible. This continuation-in-part discloses a process essentially similar to that already disclosed in said copending application and additionally discloses a new process for producing such novel protein flour.

OBJECTS OF THE INVENTION

An object of the present invention is to provide a novel process for extracting oleaginous seed material with aqueous alcohol solutions to produce a novel protein flour.

Another object of the present invention is to provide a novel process for extracting full-fat soybean flakes with aqueous alcohol solutions to remove a portion of the carbohydrates and non-oil lipids and substantially all of the oil.

Still another object of the present invention is to provide a novel process for extracting full-fat soybean flakes with aqueous alcohol solutions using percolation extraction techniques.

A further object of the present invention is to provide a novel process for preparing a novel protein flour by extracting particulate oleaginous seed materials using aqueous alcohol solutions as extraction solvents for a portion of the carbohydrates and non-oil lipids and substantially all of the oil.

A still further object of the present invention is to provide a novel process for extracting a portion of the carbohydrates and non-oil lipids and substantially all of the oil from oleaginous seed materials using only aqueous alcohol solutions as solvents.

Still another object of the present invention is to provide a novel protein flour.

SUMMARY OF THE INVENTION

These and other objects of the present invention are achieved by extracting particles of oleaginous seed material with aqueous alcohol solutions.

In one embodiment of the present invention for preparing a novel protein flour, the oleaginous seed material is sequentially extracted in four steps, comprising: contact with relatively dilute aqueous alcohol to remove some of the carbohydrates and non-oil lipids; contact with relatively concentrated alcohol to remove water; contact with undistilled, recycling concentrated alcohol at or near the boiling point to partially remove oil; and contact with distilled concentrated alcohol at or near the boiling point to complete oil removal. The novel protein flour is obtained by desolventizing the extracted residue.

In a second embodiment of the present invention for preparing a new protein flour, the particulate oleaginous seed material is sequentially extracted in three steps, comprising: contact with initially concentrated alcohol to remove water, non-oil lipids, some of the carbohydrates and some of the oil; contact with concentrated, undistilled, recycling concentrated alcohol at or near the boiling point to partially remove oil; and contact with concentrated alcohol at or near the boiling point to complete oil removal, followed by desolventizing of the residual solids.

In a third embodiment of the present invention for preparing a new protein flour, the particulate oleaginous material is sequentially extracted in two steps, comprising: contact with initially concentrated alcohol to remove water, most of the non-oil lipids and some of the oil; and contact with concentrated alcohol at or near the boiling point to remove the remainder of the oil.

BRIEF DESCRIPTION OF THE INVENTION

A better understanding of the present invention as well as additional objects and advantages thereof will become apparent upon consideration of the detailed disclosure thereof when taken with the accompanying drawings illustrating embodiments of the present invention wherein.

DETAILED DESCRIPTION OF THE INVENTION

Although the process is described in detail as applied to soybeans, it is to be understood that it is equally applicable to other oilseeds, such as cottonseeds, peanuts, sesame seeds, sunflower seeds, i.e., seeds containing high concentrations of nutritious proteins.

Soybean flakes are prepared by first cracking clean beans between corrugated rolls into 4 to 8 pieces which are then dehulled, softened by heat at about 160° F. and flaked between smooth rolls. Soy flakes are typically about 0.5 inch in diameter and 0.010 inch thick. Other oil seeds may be similarly flaked or simply ground to a maximum particle size of about 0.25 inch. Such flakes, as now prepared for hexane extraction, are equally well suited for the process herein disclosed.

Figure 1:
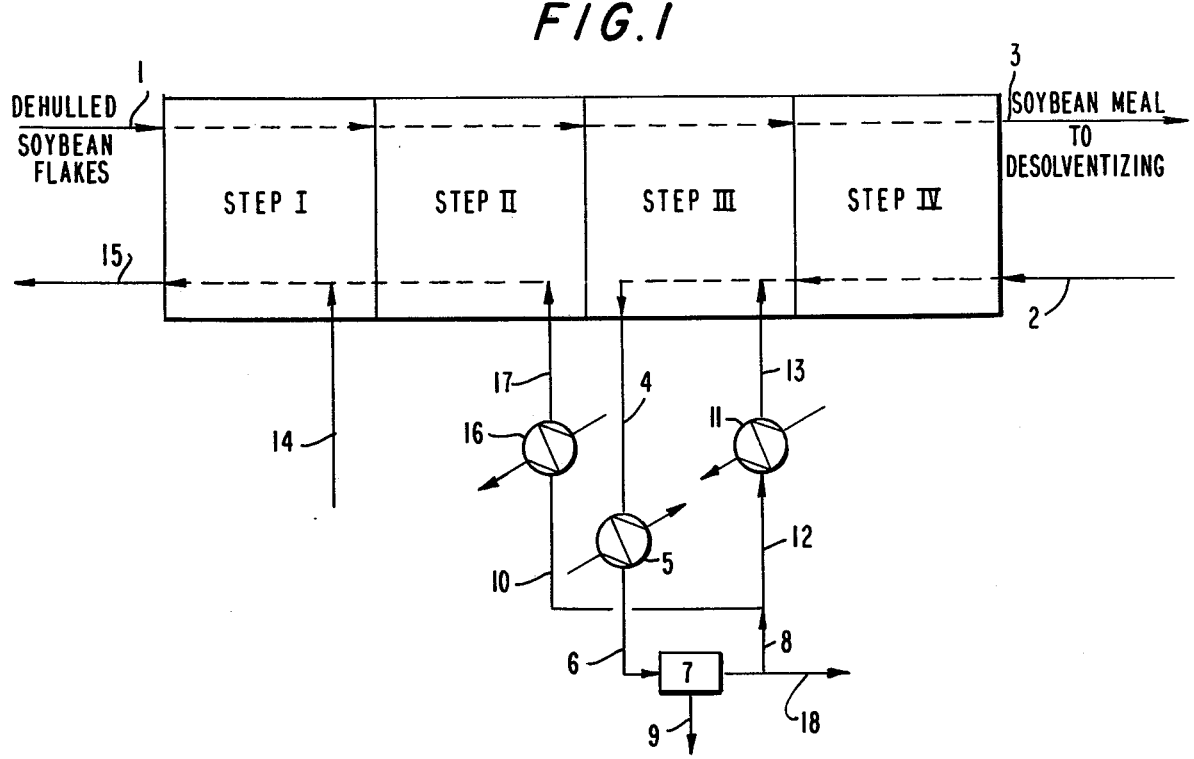
FIG. 1 is a schematic flow diagram of the four step embodiment.

The process in one embodiment comprises four sequential steps shown schematically in FIG. 1. Particulate oleaginous seed materials entering at the left in line 1, pass through Steps I, II, III and IV, sequentially. Hot aqueous alcohol, typically 92 weight percent ethanol at its boiling point, enters Step IV in line 2 and flows countercurrent to the flakes, which exit the process in line 3. Miscella (extract solution) exiting Step III in line 4 is cooled in a heat exchanger 5 to precipitate an oil phase. Mixed phases in line 6 are separated in a decanter or centrifuge 7, from which the alcohol phase exits in line 8 and the heavier oil phase exits the process in line 9. The alcohol phase is divided, a controlled portion flowing to a heater 11 through line 12, the remainder introduced into a heater 16 through line 10. Heated solution recycles to Step III through line 13; heated solution advances to Step II through line 17. Solvent exiting Step II is mixed with dilute ethanol entering in line 14, forming the dilute solution that is desired in Step I. Final miscella containing carbohydrates and non-oil lipids in solution exits the process in line 15.

I have found that substantially all of the alcohol-soluble carbohydrates and non-oil lipids dissolve in Steps I and II. Oil which enters Step II in the liquid stream in line 17 is almost completely precipitated as the alcohol is diluted in Steps II and I. Precipitated oil deposited on the flakes is recycled to Step III and redissolved. Carbohydrate miscella exiting in line 15 may be practically free of undissolved oil. Oil exiting in line 9, having been precipitated from a solution containing little carbohydrate and non-oil lipids, is pale yellow and free of "break". Although it has been my experience to date that alcohol soluble non-oil lipids are completely extracted in Steps I and II, it may be found in commercial practice that some non-oil lipids may accumulate in recycle stream 8, since such non-oil lipids are very soluble in 90% alcohol at 100° F. In that case, a small purge stream 18 is drawn off and passed to any suitable process, such as evaporation, by which means the alcohol could be recovered for recycle to the process.

As applied to soybeans, in Step I a portion of the carbohydrates and non-oil lipids are extracted from the full-fat flakes at temperatures preferably in the range of 95° to 175° F., using as solvent aqueous ethanol in the concentration range of 50 to 70 weight percent. In Step II, flakes are dewatered, preferably at the same temperature as in Step I, by countercurrent extraction with approximately 90 weight percent ethanol. In Step III, most of the oil is extracted into a recycling stream of approximately 90 weight percent ethanol at or near the boiling point. In Step IV, the remainder of the oil is extracted with approximately 92 weight percent ethanol.

Extraction temperature and alcohol concentration in Steps I and II depend on the properties desired in the protein product. High temperature and low concentration cause rapid loss of protein dispersibility and water absorption, which it is sometimes desired to preserve. I have disclosed, in copending application Ser. No. 549,434, assigned to the same assignee as the present invention, that Soy Protein Concentrate with a high protein dispersibility index (PDI) can be obtained by prolonged extraction with 70% ethanol at 95° F. If PDI is of no concern extraction can be accelerated and a lower ratio of solvent to flakes employed by extracting with ethanol as dilute as 50% and at a temperature as high as the boiling point.

In step II, dilute alcohol carried with the flakes from Step I is displaced by concentrated alcohol. The flakes must be effectively contacted for a time sufficient for complete displacement I prefer as a practical matter to have the temperature in Step II the same as that of Step I. This is particularly true when high PDI in the protein concentrate product is desired, since protein will be rapidly denatured if the flakes are in contact with hot dilute alcohol before being displaced by concentrated alcohol. When Steps I and II are carried out at a temperature at or near the solvent boiling point, some oil is extracted in Step II, but the oil is largely precipitated from the dilute solution in Step I and redeposited on the flakes.

In Steps III and IV, oil is extracted by concentrated alcohol at or near the boiling temperature. Since soybean oil has a solubility of only about 3.5% in boiling 90 weight percent ethanol, and the maximum practical concentration of the ethanol recovered by distillation in line 2 is about 92%, it becomes apparent why Step III is generaly required and why almost complete displacement of dilute alcohol in Step II is essential. Oil is removed from the system by virtue of the difference in its solubility at the boiling temperature and at the temperature in line 6, which without resort to refrigeration is at least 100° F. With 90% ethanol, this difference is about 2.25%. Thus, if 18 lbs. of oil is to be extracted from 100 lbs. of full-fat flakes, the flow in line 4 must correspond to at least 800 lbs. (18/0.0225). If the concentration of alcohol in line 4, which is determined by the amount of water entering with the flakes from Step II, falls much below 90%, the flow in line 4 becomes prohibitively high.

In general, I prefer to cool the miscella in line 4 to the minimum that is practical with the cooling water available, in order to minimize recycling in Step III and to improve extraction in Step IV. It is to be understood, however, that the heater 16 may be optionally omitted by controlling the temperature in line 6 at the temperature desired in Step II. It is also to be understood that if oil solubility at the solvent boiling point is high, Step III may be omitted, i.e., lines 12 and 13 and the heater 11. It is also to be understood that it is desirable to have a minimum of solvent carried with the solvents leaving each step.

The above described process differs from the process described in U.S. application Ser. No. 611,066 only in the amount of the flow in stream 15. To make soy protein concentrate, flow in stream 15 must be at least about 2.5 pounds per pound of soybeans fed in line 1. With lower flows, the proteinaceous product contains less than 70% protein, and is classified as a soy flour.

Figure 2:
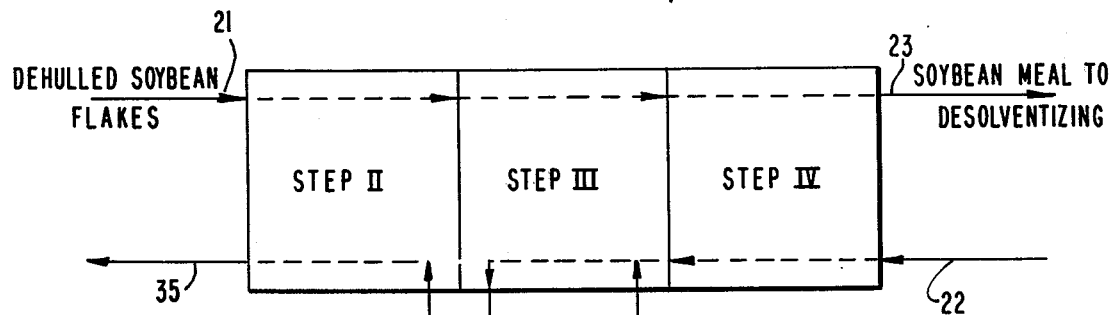
FIG. 2 is a schematic flow diagram of the three step embodiment.

In the second embodiment of the process, applicable if the presence in the proteinaceous product of some or most of the carbohydrates in the beans is tolerable, Step 1 is eliminated, the particulate oleaginous seed materials in line 21 sequentially passing through Steps II, III and IV, as illustrated by FIG. 2. Hot aqueous alcohol, typically 92 weight percent ethanol at its boiling point, enters Step IV in line 22 and flows countercurrent to the flakes. Miscella (extract solution) exiting Step III and line 24 is cooled in a heat exchanger 25 to precipitate an oil phase. Mixed phases in line 26 are separated in a decanter or centrifuge 27, from which the alcohol phase exits in line 28 and the heavier oil phase exits the process in line 29. The alcohol phase is divided, a controlled portion flowing to a heater 31 through line 32, the remainder introduced into a heater 36 through line 30. Heated solution recycles to Step III through line 33; heated solution advances to Step II through line 37. Miscella containing little carbohydrates, some oil and most of the alcohol-soluble non-oil lipids exits Step II in line 35.

It is my intent that in the practice of this embodiment of the process the alcohol solution introduced in line 22 be minimal, say not more than 1.5 pounds per pound of flakes introduced in line 21. At such a low solvent ratio, water entering in the flakes will dilute the alcohol in Step II so that at least some of the carbohydrates will dissolve. Since non-oil lipids may not be completely extracted in Step II, deleterious accumulation of non-oil lipids in stream 28 would probably occur in prolonged continuous operation. It may be necessary to bleed a small purge stream 36 from line 28 and pass such stream to an evaporator, from which condensed aqueous alcohol would recycle to the process, or pass such stream 36 to any other process capable of effecting separation between the accumulated impurity and aqueous alcohol.

The third embodiment of the process is applicable if anhydrous/or almost anhydrous alcohol is available for extraction. In that case, the solubility of soybean oil is high enough that it may not be necessary to incorporate in the process the recycle stream of Step III, thus in effect combining Steps III and IV. Referring to FIG. 2, operation of the process is as just described for the second embodiment, except that flow in line 33 is zero, and there is no heater 31. Some of the oil is removed in line 29, the rest in line 35, along with non-oil lipids. Little or no carbohydrate is extracted.

There has been disclosed and used a great variety of equipment and methods for extracting particulate oleaginous seed materials. In less preferred methods, particulates are immersed in and conveyed through the solvent, either in countercurrent stages, each consisting of a soaker followed by solids-liquid separation, or in a column or conveyor in which there is counterflow of particulates and solvent. When the particulates are flakes, there is considerable breakage and fines in the miscella which are troublesome. It has been the experience in the extraction of oilseeds that percolation extraction, defined as a process in which the particulates form beds through which solvent percolates, is superior to immersion extraction. The reasons are that the bed itself is an excellent filter for the miscella, that the spent particulates can be drained by gravity prior to desolventizing, that the bed affords efficient contact between particulates and solvent, and that there is practically no mechanical wear of the equipment.

Although the process of my invention may be practiced in any suitable countercurrently operated liquid-solids contactors used for washing or leaching, I prefer, based on the experience of the oilseed industry, to employ percolation extraction techniques. A commercially proven extractor particularly suited for the practice of my invention is the rotary extractor described in U.S. Pat. No. 2,840,459.

In that extractor, a rotor divided into sector cells rotates in a vapor-tight tank above stationary stage compartments. Each cell is open at the top and closed at the bottom by a hinged perforated door. Solids are fed continuously into each cell as it passes under a loading zone, and fall from the cell when its door opens above a discharge zone almost completely around the circle from the feed zone. Solvent is advanced counter to the direction of rotation by a series of stage pumps, which pump miscellas of gradually increasing concentration into distribution manifolds positioned over the free-draining beds formed in the cells.

In percolation extraction practice, the flakes are usually slurried in miscella before they are introduced into the extractor to form the free-draining bed. The bed so formed is homogeneous and free of air pockets. As disclosed in my aforementioned copending application Ser. No. 549,434, flakes to be extracted with an aqueous alcohol must be slurried in recycle miscella and soaked for 5-10 minutes, to ensure that they are completely swelled. Soybean flakes swell considerably when soaked in dilute alcohol. Full-fat flakes sufficient to make a bed having a volume of one cubic foot, after soaking in 55 weight percent ethanol, formed a bed whose volume is 1.4 cubic feet. If this swelling occurs in place after the bed is formed, the bed becomes impermeable to solvent flow.

Extraction of flakes in a percolation extractor can be faithfully simulated in the laboratory by percolating through a bed of flakes in a stationary vertical tube a succession of miscellas of decreasing concentration, corresponding to the miscellas collected in the stage compartments and pumped to the manifolds by each stage pump. To establish correct concentrations of the miscellas, a first batch of flakes is extracted with fresh solvent only, and the miscella draining from the bed is collected in successive measured cuts. The first cut, equivalent to final miscella, is discarded, and other cuts are percolated in succession through a second batch of flakes, followed by an amount of fresh solvent whose ratio to flakes in the batch is the same as the ratio of solvent to flakes fed in the continuous process being simulated. After treating several batches of flakes, the concentration of the miscella cuts reach a steady state characteristic of the operation of a continuous extractor.

Simulation of the complete process of FIGS. 1 and 2 by extraction of successive batches is more complex. Nevertheless, the four-step process of FIG. 1 can be simulated by accumulating four sets of miscella cuts, advancing miscella from Step IV to III to II to I, and carrying out the cooling, mixing, recycling, and reheating shown in FIG. 1. Likewise, the three-step process of FIG. 2 can be simulated by accumulating three sets of miscella cuts.

The parameters that determine the steady state in any one step of extraction are temperature, ratio of solvent to feed, and retention time. Simulation of the process of FIGS. 1 and 2 is more complex in that additional parameters must be selected, e.g. solvent flow in both lines 2 and 14, and lines 22 and 37, recycle solution flow in lines 13 and 33, temperature of two-phase flow in lines 6 and 26, and retention time in each of the steps of FIGS. 1 and 2, respectively.

EXAMPLE OF THE INVENTION

EXAMPLE I

Full-fat dehulled soybean flakes were extracted in accordance with the process of FIG. 1. In a number of successive batches, flakes were presoaked in the solution equivalent to that in line 15 (FIG. 1) for 10 minutes and then poured into a vertical glass tube closed at the bottom by a screen. Each batch was treated in immediate succession with aqueous ethanol solutions as in FIG. 1. Retention time in Step I was a half hour, in each of the other steps one hour. The runs were based on the following additional parameters as set forth in the following Table I using as a basis 100 pounds of flakes:

TABLE I

| Lines | 2 | 6 | 13 | 14 | 17 |
|---|---|---|---|---|---|
| Temperature | Boiling | 110 | Boiling | 130° F. | 130° F. |
| Flow (pounds) | 150 | | 800 | 50 | |
| ETOH Conc. (wt. %) | 92 | — | | 8.0 | — |

When the steady state was reached, the various streams were measured as set forth in the following Table II:

TABLE II

| Lines | 15 | 9 | 4 | 8 | 3 |
|---|---|---|---|---|---|
| Flow (pounds) | 160 | 21.5 | 883 | 861 | 116.5 |
| Solute (wt. %) | 8.0 | — | — | — | — |
| Lipids (wt. %) | 2.0 | — | 3.3 | 1.1 | 0.5* |
| ETOH Conc. (wt. %) | 59.0 | — | 89.9 | — | |
| Volatiles (wt. %) | — | 8.5 | — | — | 50 |
| Proteins (wt. %) | 0.50 | — | — | — | 64.1 |

*dry basis

The only apparent difference between this product and that described in aforesaid application Ser. No. 611,066 wherein more alcohol was used for Step I, was that particles of hull not completely removed in the dehulling step prior to flaking were not as well decolorized in the present example.

EXAMPLE II

Full-fat dehulled soybean flakes were extracted by the process of FIG. 2. In a number of successive batches, flakes were presoaked in the solution equivalent to that in line 15 for 5 minutes and then poured into a vertical glass tube closed at the bottom by a screen. Each batch was treated in succession with strong aqueous ethanol solutions as in FIG. 2. Retention time in Step II was one hour, in Steps II and III each ½ hour. The runs were based on the following additional parameters as set forth in the following Table III using as the basis 100 pounds of flakes:

TABLE III

| Line | 22 | 26 | 33 | 37 |
|---|---|---|---|---|
| Temperature | Boiling | 110° F. | Boiling | Boiling |
| Flow (pounds) | 125 | — | 800 | — |
| ETOH Conc. (wt. %) | 92 | | | |

When the steady state was reached, the various streams were measured as set forth in the following Table IV:

TABLE IV

| Line | 35 | 29 | 24 | 28 | 23 |
|---|---|---|---|---|---|
| Flow (pounds) | 69.0 | 21.5 | 883 | 861 | 140 |
| Solute (wt. %) | 8.3 | | | | |
| Lipids (wt. %) | 6.8 | | 3.3 | 1.1 | 0.5* |
| ETOH Conc. (wt. %) | 77.0 | | 90.1 | | |
| Volatiles (wt. %) | | 8.5 | | | 50 |
| Protein (wt. %) | 0.3 | | | | 58.3* |

*dry basis

It will be noted that in this example Step II was carried out at the boiling temperature of the aqueous alcohol solvent. The advantages of employing high temperature are that water is more efficaciously removed at high temperature than at low, and that in commercial practice a single extractor can be used for all three steps. The disadvantage is that enough oil is extracted in Step II that it must be recovered from the miscella in line 19 as well as from the miscella in line 9. This disclosure contemplates operation of Step II at any desired temperature up to the boiling point of the aqueous alcohol solvent.

These data can be the basis for commercial processes which include in their entirety distilling solvent from the oil phase in lines 9 or 29; desolventizing the extracted flakes in lines 3 or 23 to produce novel high-protein flours; separating oil and non-oil lipids from the carbohydrate-enriched miscella in line 15 (FIG. 1) or line 35 (FIG. 2); and distilling the miscella in lines 15 or 35 to recover strong alcohol in lines 2 or 22 and dilute alcohol in line 14 (FIG. 1) as distillates, and carbohydrates in alcohol-free aqueous solution as bottoms; or distilling the miscella in line 35 (FIG. 2) to recover strong alcohol in line 22 as a distillate, the carbohydrates in alcohol free aqueous solution as bottoms. Distillation of these carbohydrate miscellas may be performed in accordance with the teachings of my copending applications Ser. No. 519,228, now abandoned and Ser No. 745,397, assigned to the same assignee as the present invention.

Soy protein flours made by the process of the present invention are white, substantially free of lipids, and have a protein content that depends on the amount of carbohydrate removed, which increases as the two step, three step, or four step embodiment of the invention is applied.

Although the process of the present invention is described with reference to aqueous ethanol as to the preferred solvent because there is no objection to a food product containing traces thereof, and to soybeans, it is to be understood that the invention is applicable whatever the aqueous solvent, and whatever the oil seed being treated.

I claim:

1. A process for extracting oleaginous seed material comprised of non-oil lipids and lipids to prepare a protein flour therefrom which comprises:
    (a) countercurrently contacting said seed material with a first concentrated solution of an alcohol in water to extract water, most of said non-oil lipids and some of said lipids;
    (b) withdrawing a miscella from step (a);
    (c) countercurrently contacting the seed material from step (a) with a second concentrated solution of said alcohol in water to extract substantially all of said lipids;
    (d) withdrawing a lipid-rich miscella from step (c);
    (e) cooling said lipid-rich miscella to separate a solvent phase and a lipid phase;
    (f) returning all or a large portion of said solvent phase to the process and withdrawing said lipid phase and the remaining small portion, if any, of said solvent phase from the process; and
    (g) desolventizing the seed material from step (c) to yield a low-lipid protein flour.

2. The process as defined in claim 1 wherein the temperature in step (c) is about the boiling point of said second concentrated solution of said alcohol in water.

3. The process as defined in claim 1 wherein said alcohol is selected from the group consisting of monohydric aliphatic alcohols having from 1 to 4 carbon atoms.

4. The process as defined in claim 3 wherein said alcohol is ethanol.

5. The process as defined in claim 4 wherein said oleaginous material is soybean.

6. The proteinaceous product produced by the process of claim 5.

7. The process as defined in claim 1 wherein said first concentrated solution of an alcohol in water is constituted of all of said solvent phase returned to said process in step (f).

8. The process as defined in claim 7 wherein said oleaginous material is soybeans and said second concentrated solution is a solution of ethanol in water containing in excess of 92% ethanol by weight.

9. The proteinaceous product produced by the process of claim 8.

10. The process as defined in claim 1 wherein said first concentrated solution of an alcohol in water is a portion of the solvent phase returned to said process in step (f), and the other portion recycles to a zone in step (c) intermediate the point of entry of said second concentrated solution and the point of withdrawal of said liquid-rich miscella.

11. The process as defined in claim 10 wherein said oleaginous material is soybeans and said second concentrated solution is a solution of ethanol in water containing less than 94% ethanol by weight.

12. The proteinaceous product produced by the process of claim 11.

13. The process as defined by claim 1 wherein the seed material from step (a) is treated prior to step (c) with a concentrated, undistilled, recycled alcohol to partially removed said lipids and wherein a resulting lipid-rich miscella is combined with the lipid-rich miscella of step (c) prior to step (d).

14. The process as defined in claim 13 wherein said concentrated, undistilled, recycled solvent is at a temperature of about the boiling point thereof.

15. The product produced by the process of claim 14.

16. The process as defined in claim 1 wherein said seed material prior to step (a) is contacted with relatively dilute aqueous alcohol to remove some carbohydrates in said seed material.

17. The process as defined in claim 13 wherein said seed material prior to step (a) is contacted with relatively dilute aqueous alcohol to remove some carbohydrates in said seed material.

18. The process as defined in claim 17 wherein said concentrate solution of alcohol of step (c) is distilled concentrated alcohol.

19. The process as defined in claim 18 wherein said distilled concentrated alcohol is at a temperature near the boiling point thereof.

20. The product produced by the process of claim 19.

* * * * *